United States Patent
Nagao et al.

[11] Patent Number: 5,986,354
[45] Date of Patent: Nov. 16, 1999

[54] DC SOURCE SYSTEM WITH SOLAR CELL, AND ITS OPERATION METHOD

[75] Inventors: Yoshitaka Nagao, Kyoto; Kimitoshi Fukae, Nara; Nobuyoshi Takehara, Kyoto, all of Japan

[73] Assignee: Canon Kabushiki Kaisha, Tokyo, Japan

[21] Appl. No.: 08/637,213

[22] Filed: Apr. 24, 1996

[30] Foreign Application Priority Data

Apr. 24, 1995 [JP] Japan ................................. 7-120412
Apr. 12, 1996 [JP] Japan ................................. 8-114414

[51] Int. Cl.⁶ ................................................. H02J 7/00
[52] U.S. Cl. ................................. 307/64; 307/44; 323/906
[58] Field of Search ................................. 307/43, 64, 66, 307/44, 48; 320/1, 6; 323/906

[56] References Cited

U.S. PATENT DOCUMENTS

| | | | |
|---|---|---|---|
| 4,449,057 | 5/1984 | Ishiwata | 307/43 |
| 4,667,142 | 5/1987 | Butler | 320/6 |
| 4,709,200 | 11/1987 | Ochiai | 320/1 |
| 4,963,811 | 10/1990 | Weber | 320/1 |
| 5,420,497 | 5/1995 | Kimura et al. | 323/224 |
| 5,493,155 | 2/1996 | Okamoto et al. | 307/45 |
| 5,501,083 | 3/1996 | Kim | 62/228.4 |

FOREIGN PATENT DOCUMENTS

| | | | |
|---|---|---|---|
| 59-162734 | 9/1984 | Japan | H02J 9/06 |
| 4109863 | 4/1992 | Japan | H02M 1/10 |
| 4174262 | 6/1992 | Japan | F25B 27/00 |
| 6142233 | 5/1994 | Japan | A63B 53/00 |

Primary Examiner—Jeffrey Gaffin
Assistant Examiner—Jonathan S. Kaplan
Attorney, Agent, or Firm—Fitzpatrick, Cella, Harper & Scinto

[57] ABSTRACT

In order to prevent a device serving as a load from being destroyed or causing an operation error while assuring an optimum operation voltage of a solar cell, and to stably, efficiently obtain power, a DC source system, in which a solar cell (1) and a DC source (3) are connected to an output terminal connected to a load (2) in parallel with each other, includes a first switch (5) arranged between the load (2) and the solar cell (1), a second switch 7 arranged between the load (2) and the DC source, and a capacitor (6) arranged between the load and the first switch in parallel with the solar cell.

11 Claims, 6 Drawing Sheets

DC SOURCE SYSTEM WITH SOLAR CELL, AND ITS OPERATION METHOD

BACKGROUND OF THE INVENTION

1. Field of the Invention

The present invention relates to a DC source system and its operation method and, more particularly, to a DC source system in which a solar cell and a DC source are connected in parallel with each other, and its operation method.

2. Related Background Art

In recent years, global warming, exhaustion of fossil fuels, radioactive pollution caused by nuclear power plant failures and radioactive waste, and the like pose serious problems, and people are increasingly showing interest in global environment and energy problems. Under such situation, a solar cell is expected as an inexhaustible, clean energy source. Systems that utilize solar cells have a variety of scales ranging from several watts to several thousands of watts, and various kinds of systems are available. For example, a system that directly uses generated electricity as power, a system that stores generated electricity in a battery, a system that utilizes a solar cell in cooperation with a commercial source, and the like are known. Of these systems, as the system that utilizes a solar cell as a source in cooperation with the commercial source, a power system which converts a DC voltage output from the solar cell into an AC voltage using an inverter and performs reverse load flow with respect to the commercial source has been proposed. However, the inverter is expensive, and such system is not yet popular. Also, a method which utilizes a DC voltage output from a solar cell in an inverter air conditioner via a DC/DC converter (Japanese Laid-Open Patent Application No. 4-174262), and a system in which a solar cell is DC cascade connected to a DC source from a commercial system via a reverse-flow prevention diode so as to be connected to a DC load (e.g., an inverter air conditioner) including an inverter (Japanese Laid-Open Patent Application No. 4-109863) have been proposed.

However, when the DC voltage output from the solar cell is supplied to a load via the DC/DC converter, the cost increases, as described above.

When the solar cell is DC cascade connected via the reverse-flow prevention diode, the DC voltage output from the solar cell rises when the load decreases or stops, and the open voltage of the solar cell or a voltage approximate to that voltage may be applied to the inverter.

When such voltage is applied to the inverter, if it is higher than the withstand voltage of the inverter, the inverter may be destroyed. For this reason, the open voltage of the solar cell must be set to be equal to or lower than the withstand voltage of the inverter.

Therefore, when the solar cell is simply operated at an optimum operation voltage, a problem may arise depending on the load state.

SUMMARY OF THE INVENTION

The present invention has been made in consideration of the above-mentioned problems and has as its object to provide a DC source system in which a solar cell and a DC source are connected in parallel with each other, and which can prevent destruction and operation errors of a device serving as a load while assuring an optimum operation voltage of the solar cell, and can stably and efficiently obtain power.

It is another object of the present invention to provide a source system and its operation method, which can effectively supply power of a solar cell to a load and can also supplement a power short by power supplied from a DC source, and which can stably supply power to the load irrespective of the remaining capacity when the DC source is a source obtained by rectifying a commercial AC source.

It is still another object of the present invention to provide a source system and its operation method, which can prevent a device from being destroyed or erroneously operated upon application of a surge voltage due to an open voltage, when a solar cell is connected to a device serving as a load.

It is still another object of the present invention to provide a source system and its operation method, which can reduce the consumption power of a load and can disconnect a solar cell when a voltage applied to the load becomes high, since a switch means is arranged on the side of the solar cell.

It is still another object of the present invention to provide a source system and its operation method, which can efficiently obtain power from a solar cell since a DC source voltage is set to be an optimum operation voltage, and can efficiently obtain power without any optimum operation voltage tracking control in the case of, especially, an amorphous solar cell.

It is still another object of the present invention to provide a DC source system, in which a solar cell and a DC source are connected to a load in parallel with each other, comprising first switch means arranged between the load and the solar cell, second switch means arranged between the load and the DC source, and a capacitor arranged between the load and the first switch means in parallel with the solar cell, and an operation method of the system wherein the first switch means is closed, and thereafter, the second switch means is closed.

DETAILED DESCRIPTION OF THE PREFERRED EMBODIMENTS

The present invention will be described below with reference to the accompanying drawings as needed.

According to the present invention, in a DC source system in which a solar cell and a DC source are respectively connected to a DC load in parallel with each other, a first switch is arranged between the solar cell and the load, a second switch is arranged between the DC source and the load, and a capacitor is inserted between the first switch and the load to be connected in parallel with the solar cell.

In the operation of this system, upon operation of the load, the first switch is closed, and thereafter, the second switch is closed.

According to the present invention, the first switch can disconnect power supply from the solar cell, as needed. With this arrangement, the open voltage of the solar cell or a voltage approximate to that voltage can be prevented from being applied to an electronic device serving as the load. More specifically, when the first switch is arranged to stop power supply from the solar cell as needed, the device serving as the load can be prevented from causing an operation error or being damaged. Since the withstand voltage of the device serving as the load need not be selected to be higher than the open voltage of the solar cell, the device selection range can be broadened.

According to the present invention, since the capacitor is connected in parallel with the solar cell, even when the first switch is closed, the open voltage of the solar cell or a surge voltage approximate to the open voltage can be prevented from being applied to the load. Therefore, the device serving as the load can be prevented from causing an operation error or being damaged.

Note that the first and second switches serving as the open/close means need only electrically turn on/off an electrical circuit. More specifically, each of the first and second switches can comprise a switch such as a toggle switch, a locker switch, or the like, which has mechanical contacts, a relay, or a semiconductor element such as a transistor, which has no mechanical contacts. However, the present invention is not limited to a specific means as long as its current capacity and withstand voltage can withstand the load capacity and the voltage of the solar cell.

A reverse-flow prevention means is preferably arranged between the load and the solar cell and/or the DC source so as to prevent the reverse flow of a current. The reverse-flow prevention means is not particularly limited as long as it can prevent the reverse flow of a current. More specifically, a rectifier or diode (e.g., a rectifying diode, a Schottky diode, or the like) may be used.

In consideration of a loss caused by a forward bias voltage drop, a Schottky diode is preferably used in a low-voltage system; a rectifying diode is preferably used in a high-voltage system in consideration of the withstand voltage.

As a DC source 3, a storage battery represented by a lead-acid battery, a dry cell, a low-voltage source for obtaining a DC current by rectifying an AC current, or the like can be used. In particular, the source for obtaining a DC current by rectifying the AC current is most preferable as the one to be used in the present invention since one need not worry about exhaustion of the battery and it is very easy to use for general users.

As a capacitor 6, an aluminum electrolytic capacitor, a tantalum electrolytic capacitor, a laminated ceramic capacitor, or the like can be used. In order to obtain an improved surge absorption effect, a low-impedance capacitor is required. In the embodiment to be described below, an aluminum electrolytic capacitor was used.

The present invention will be described in more detail below.

Figure 1:
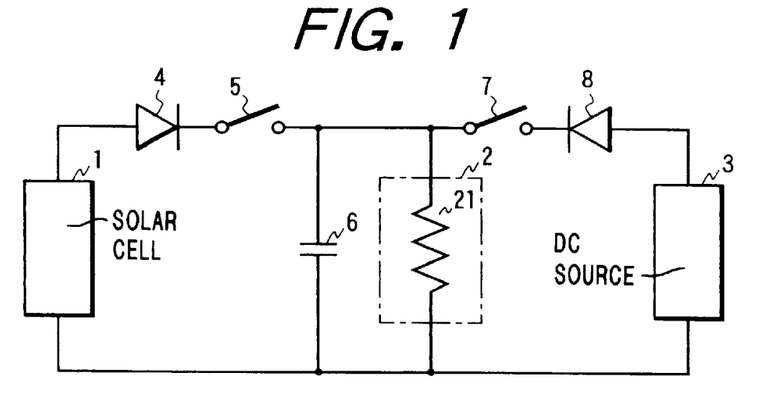
FIGS. 1, 7A, 7B, and 9 are schematic circuit diagrams of a DC source system according to preferred embodiments of the present invention.

FIG. 1 is a schematic circuit diagram of a DC source system according to the preferred embodiment of the present invention. The system shown in FIG. 1 includes a solar cell 1, a DC load 2, a DC source 3, diodes 4 and 8 serving as reverse-flow prevention means for preventing the reverse flow of currents from the solar cell 1 and the DC source 3 to the DC source 3 and the solar cell, switches 5 and 7 serving as open/close means which can stop power supply from the respective sources, a capacitor 6, and a load resistor 21.

In this embodiment, the solar cell module 1 comprises an amorphous solar cell module (nominal output: 22 W), and is connected to the DC load 2 (more specifically, the resistor 21 of 10 Ω) via the first reverse-flow prevention diode 4 and the first switch 5. The resistor 21 is connected in parallel with the capacitor 6. On the other hand, the resistor 21 is connected to the bipolar DC source 3, which is connected to a single-phase commercial system supplied for domestic use, and includes a rectification circuit for converting AC power from the commercial system into DC power via the second switch 7 and the second reverse-flow prevention diode 8. With this circuit, the resistor 21 receives DC power. A case will be examined below wherein a voltage of 12 V is applied to the resistor 21. In order to apply this voltage to the resistor, the output voltage from this DC source is set to be about 13 V in consideration of the voltage drop across the reverse-flow prevention diode and the like. The quantity of sunshine incident on the solar cell to obtain this voltage is about 50 mW/cm$^2$, in this embodiment.

Power supply to the resistor 21 is attained by setting the switches 5 and 7 in the closed state. When no capacitor 6 is connected, a surge voltage is applied to the resistor 21, as shown in, e.g., FIG. 2.

Figure 2:
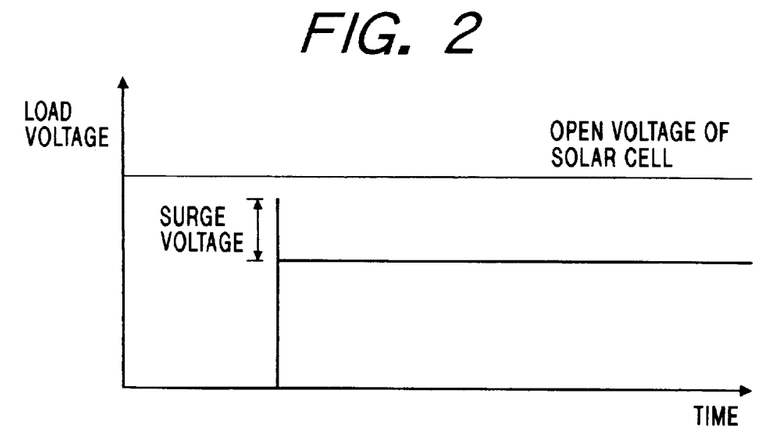
FIGS. 2, 3A, and 3B are graphs for explaining a change in voltage when a solar cell is connected to a load.

If the solar cell generates sufficient power, this surge voltage becomes the open voltage of the solar cell or a voltage approximate thereto. Therefore, the open voltage of the solar cell or the voltage approximate thereto is instantaneously applied to the resistor 21. For this reason, if the resistor 21 cannot withstand this voltage value, the resistor 21 may be damaged (e.g., disconnected) or may deteriorate even when it does not suffer such damage.

In this embodiment, since the capacitor is inserted in parallel with the solar cell, the problem caused by the surge voltage can be solved. Table 1 below summarizes an example of the relationship between the surge voltage and the capacitance of the capacitor. In Table 1 below, the surge voltage is measured when the switch 5 on the side of the solar cell 1 is closed, and thereafter, the switch 7 on the side of the DC source 3 is closed ("Solar cell first" in Table 1 below), and when the switch 7 on the side of the DC source 3 is closed, and thereafter, the switch 5 on the side of the solar cell 1 is closed ("DC source first" in Table 1 below).

TABLE 1

| Order of Connection | Capacitor Capacitance | | | | |
|---|---|---|---|---|---|
| | None | 1 μF | 10 μF | 50 μF | 100 μF |
| DC source first | 5.2 V | 4.1 V | 3.0 V | 1.2 V | 0 V |
| Solar cell first | 5.1 V | 3.3 V | 0.1 V | 0.1 V | 0 V |

As can be understood from the results in Table 1 above, the following effects are obtained.

(1) By connecting the capacitor, the surge voltage can be reduced.

(2) As the capacitor capacitance increases, the surge voltage can be reduced.

(3) When the solar cell is connected first to the load, the surge voltage can be reduced, and the surge voltage reduction effective is remarkable from a small capacitance region of the capacitor.

Therefore, for example, if a C-MOS IC is connected as the load in place of the resistor 21 and is destroyed upon application of a high surge voltage or if an electronic load may cause an operation error due to a surge voltage, the surge voltage must be eliminated. According to this embodiment, by inserting the capacitor, the surge voltage can be lowered.

In consideration of the connection order of the source to the load, the surge voltage can be eliminated more effectively.

In this embodiment, as shown in Table 1 above, when the capacitor of capacitance=100 $\mu$F is connected, no surge voltage is measured. When the solar cell is connected first in the connection order of the source to the load, the surge voltage can be lowered to a practical level even by a capacitance=10 $\mu$F as a value $\frac{1}{10}$ the above-mentioned value.

Figure 3A:
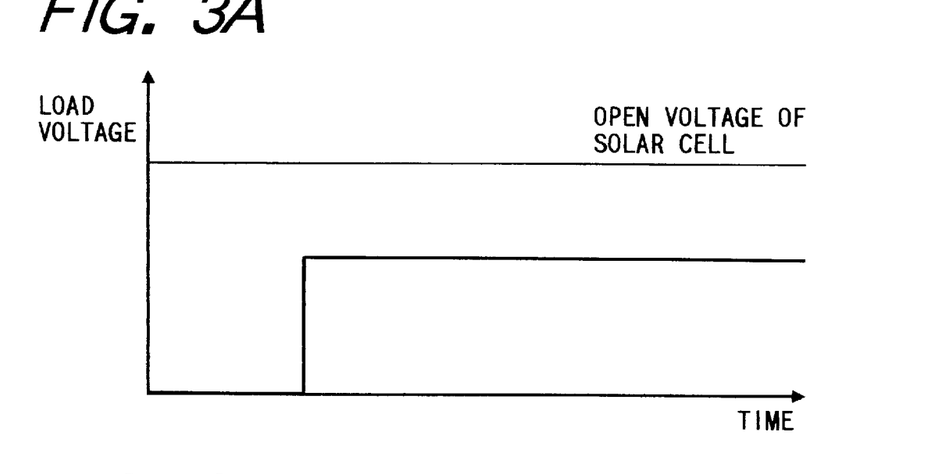
Figure 3B:
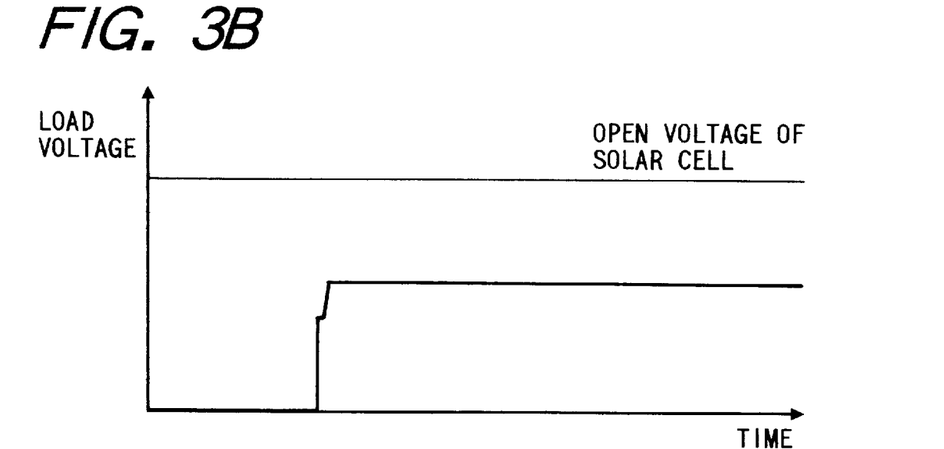

FIGS. 3A and 3B show examples of a change in voltage to be applied to the resistor 21 before and after the switch 5 is closed. In both the examples, the surge voltage is 0. Although the voltage ideally changes, as shown in FIG. 3A, it may often change, as shown in FIG. 3B in practice due to, e.g., the balance between the power supply amount of the solar cell and the consumption power of the load.

As the capacitor has a larger capacitance, the surge voltage can be lowered or substantially eliminated. However, if the capacitance is too large, the rising characteristics of a voltage upon connection of the source are impaired due to charging of the capacitor. For this reason, the capacitance of the capacitor is preferably set to have a value that does not cause an adverse influence on the surge voltage or a value that can substantially eliminate the surge voltage. Note that the capacitor 6 of the present invention is arranged not for smoothing out so-called voltage variations but for a surge voltage generated upon closing the switch 5. For this reason, the capacitor 6 can have a small capacitance, and does not exert a high cost load.

Figure 4:
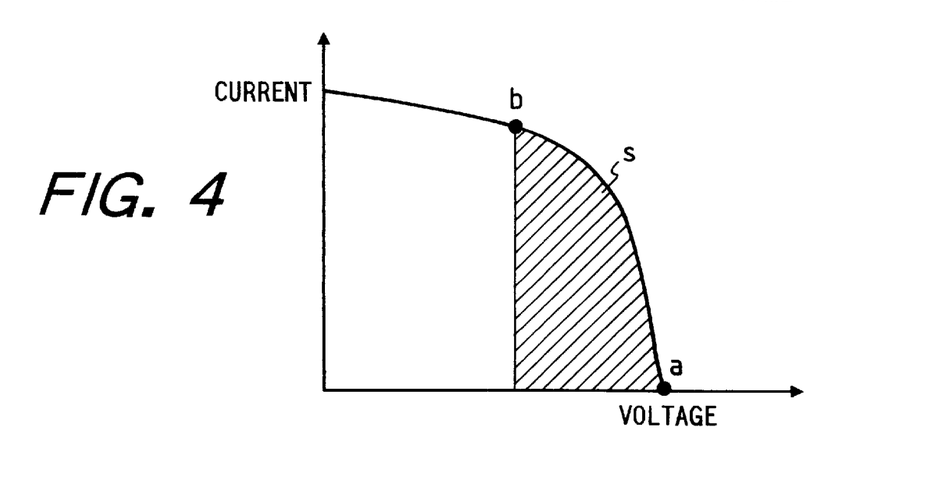
FIG. 4 is a graph showing the V-I characteristics to explain an example of the characteristics of the solar cell.

The capacitance of the capacitor 6 is preferably determined with reference to an area which is defined by the characteristics of the solar cell and the voltage, b (the operation voltage of the solar cell), of the DC source 3, as indicated by a hatched portion s in FIG. 4. That is, a model case is set, and when the area becomes larger than that of the model case, the capacitance is increased; when the area becomes smaller than that of the model case, the capacitance can be decreased. Strictly speaking, since the surge voltage is influenced by, e.g., the wiring impedance, tests are required to optimize or minimize the capacitance of the capacitor 6.

As described above, when the solar cell is connected first, i.e., when the first switch 5 is closed first, and thereafter, the second switch 7 is closed, the surge voltage is 3.3 V when the capacitance of the capacitor 6 is 1 $\mu$F, and almost no surge voltage is generated when the capacitance is 10 $\mu$F or higher. Therefore, the influence of the surge voltage can be eliminated, as shown in FIGS. 3A and 3B, by a capacitor 6 having a capacitance of about 10 $\mu$F. Since the surge voltage is generated for about 10 $\mu$sec, if the DC source is connected about 50 $\mu$sec after the solar cell is connected, the influence of the surge voltage disappears, and the influence on the load can be substantially eliminated.

Figure 5:
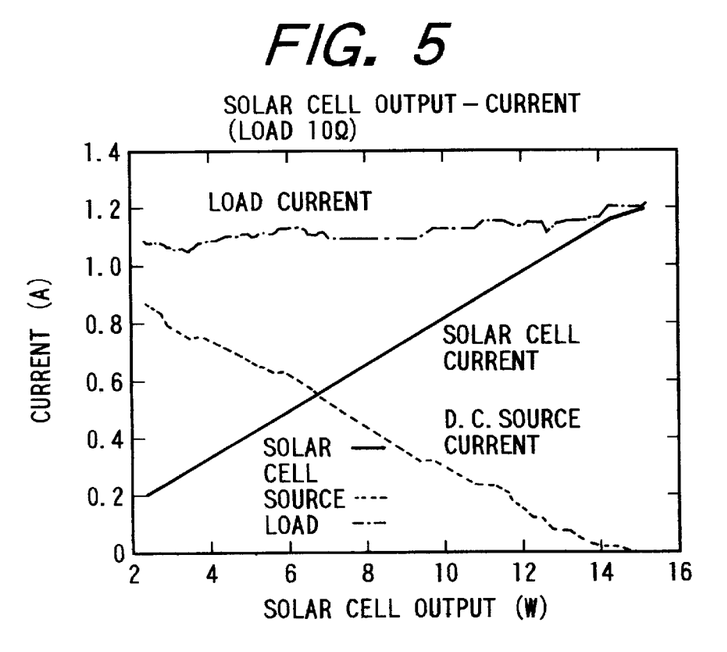
FIG. 5 is a graph for explaining an example of load sharing in the case of DC cascade connection.

In such a DC cascade connection system, as shown in FIG. 5, when light is irradiated onto the solar cell and the power generation amount of the solar cell is large, power supplied from the DC source decreases; when the power generation amount of the solar cell is small, power supplied from the DC source increases. For this reason, power required by the load can be supplied from a simple circuit.

In this embodiment, the conversion efficiency of light energy into electrical energy in the solar cell was 4.3%.

When the switch is arranged on the side of the solar cell, power supply from the solar cell side can be stopped before the voltage applied to the load increases due to a decrease in power required by the load or an increase in quantity of sunshine, thus preventing a surge voltage from being applied to the load. If this system is designed so that the highest power generated by the solar cell does not exceed the lowest consumption power of the load, the first switch need not be opened even in the above-mentioned case.

Figure 6:
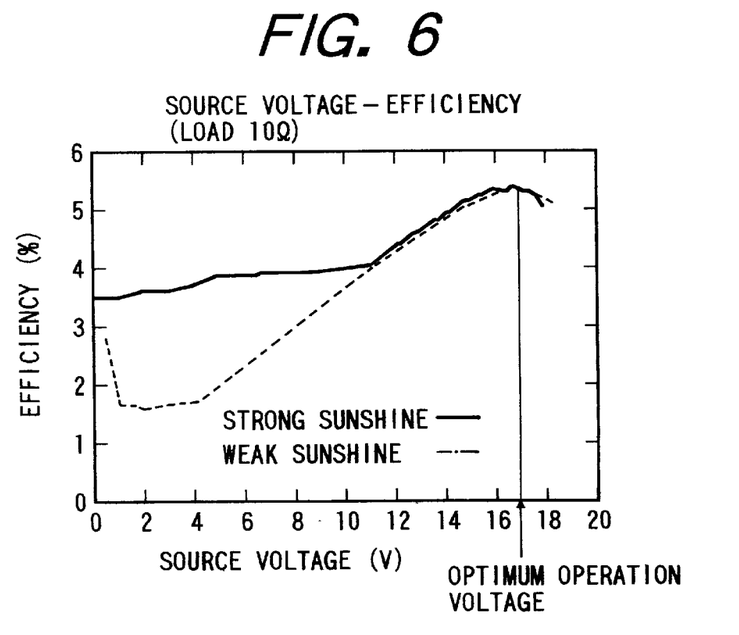
FIG. 6 is a graph for explaining an example of the solar cell efficiency as a function of the source voltage.

Even when the voltage of the DC source 3 is set to be about 17 V as the optimum operation voltage of the solar cell and the voltage of the load 21 is set to be 16 V, the capacitor 6 can be similarly connected in parallel with the load to prevent a surge voltage upon connection of the first switch on the side of the solar cell. In this case, as a result of calculation of power by measuring the current and voltage of the solar cell, and measurement of the quantity of sunshine on a reference cell, the conversion efficiency of light energy into electrical energy is 5.4%, i.e., is increased to 1.26 times as compared to a case wherein the voltage of the solar cell is 13 V, which is not the optimum operation voltage. FIG. 6 shows a change in solar cell efficiency upon a change in source voltage.

As described above, when the DC source voltage is set to be equal to the optimum operation voltage of the solar cell, the utilization efficiency of the solar cell can be remarkably improved independently of the quantity of sunshine.

Since the close timing interval between the first and second switches is normally about several 10 $\mu$sec to several msec, when the switches are manually closed, the first switch is closed first, and thereafter, the second switch is closed, thus posing no problem. Alternatively, different close timings may be mechanically set like in a switch such as a single slide switch, in which the contact points of the contacts are arranged to shift from each other.

However, when the first and second switches are electrically closed or when the first and second switches are manually simultaneously closed, the second switch may be closed before the capacitor is sufficiently charged. In this case, a surge voltage larger than expected may be generated. In view of this problem, for example, a delay circuit may be arranged, so that the first switch is closed, and thereafter, the second switch is closed after an elapse of a given time period.

Figure 7A:
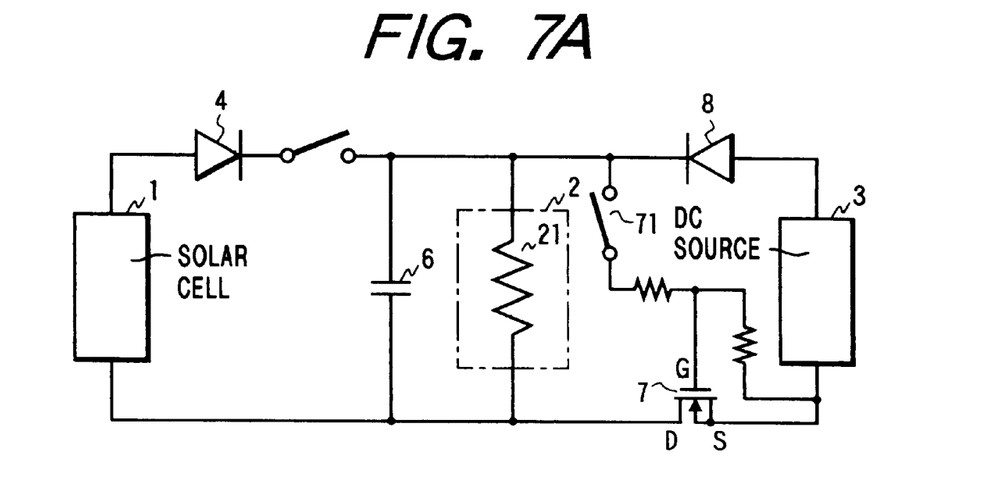
Figure 7B:
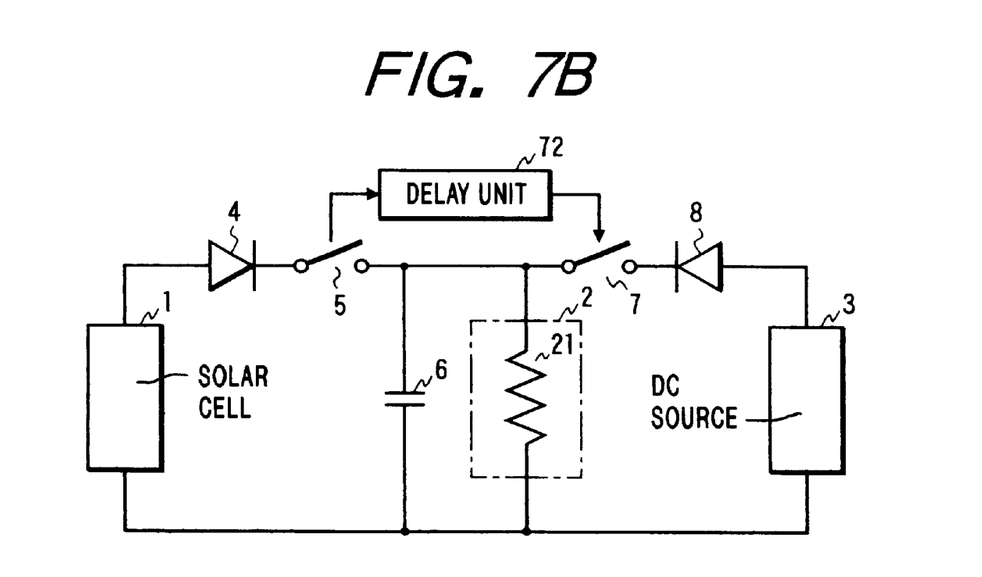

FIGS. 7A and 7B show examples of a circuit, which can set different close timings of the switches. Referring to FIG. 7A, when the switch 5 is closed, a switch 71 is similarly closed. One terminal of the switch 71 is connected to the gate (G) of a MOSFET, which serves as the switch 7, via a resistor, and the other terminal thereof is connected to the source (S) of the MOSFET via a resistor. When the switch 71 is closed, the MOSFET is enabled (the path between the source (S) and drain (D) is closed) after an elapse of a delay time corresponding to the time required for charging the gate of the MOSFET, i.e., the switch 7 is closed. As a result, the problem of generation of the surge voltage can be solved. Note that a capacitor may be inserted between the gate and source to positively delay the ON timing of the MOSFET.

FIG. 7B shows an example wherein the switch 7 is closed via a delay unit 72. The delay unit 72 can comprise a time constant circuit.

Figure 8:
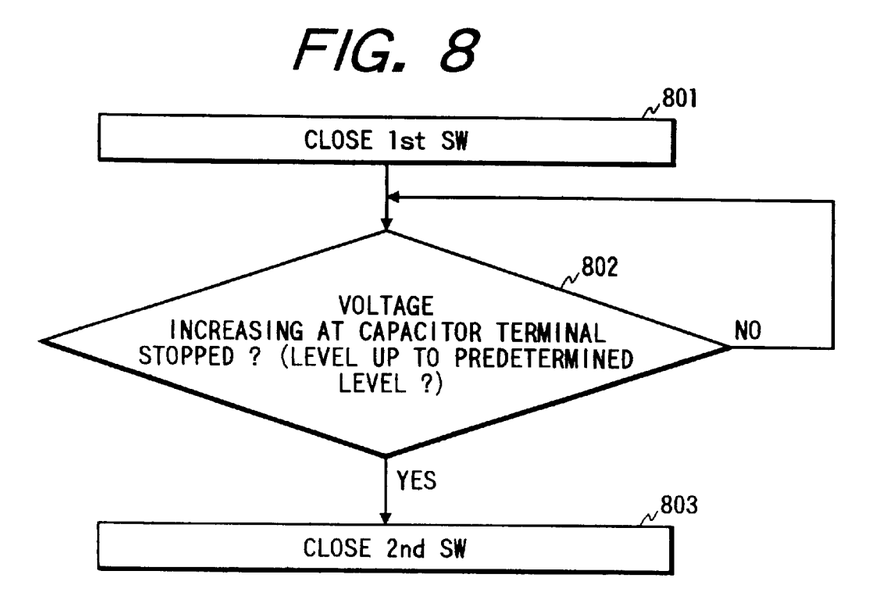
FIG. 8 is a flow chart for explaining the close timing of a switch.

Alternatively, the second switch may be closed or the circuit may be set to close the second switch in accordance with the flow chart, as shown in FIG. 8.

More specifically, when the first switch is closed (801), the terminal voltage of the capacitor begins to rise. Thus, when an increase in terminal voltage of the capacitor stops or when the terminal voltage has reached a predetermined level (802), the second switch can be closed (803).

Another embodiment of the present invention will be described below.

Figure 9:
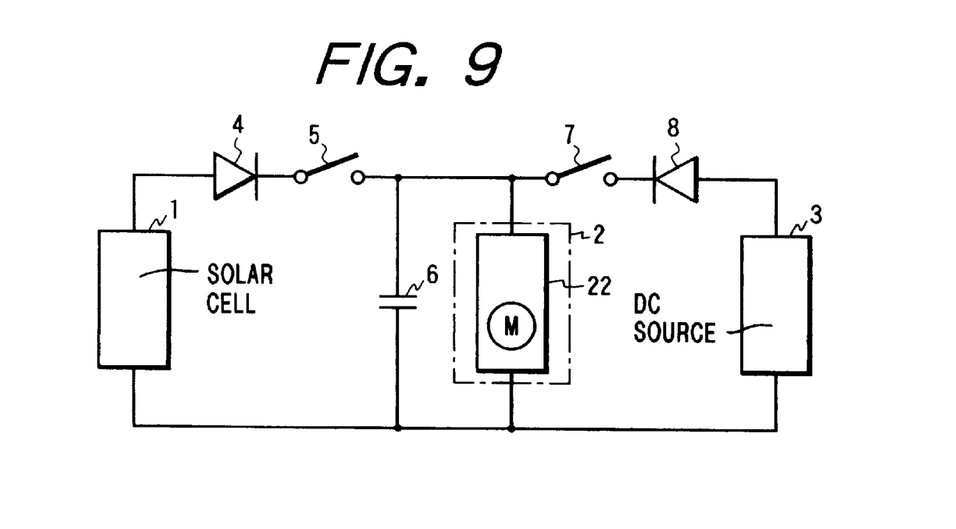

FIG. 9 shows an arrangement wherein a normal device 22 such as a tape recorder having a motor M or the like replaces the resistor 21 serving as the load in the arrangement shown in FIG. 1.

In this case as well, by inserting the capacitor or by considering the closing order of the switches, a surge voltage can be prevented from being applied to the device 22.

In the present invention, the solar cell may consist of any of a monocrystalline semiconductor, a polycrystalline semiconductor, and a non-monocrystalline semiconductor represented by an amorphous semiconductor including a micro crystal.

Figure 10:
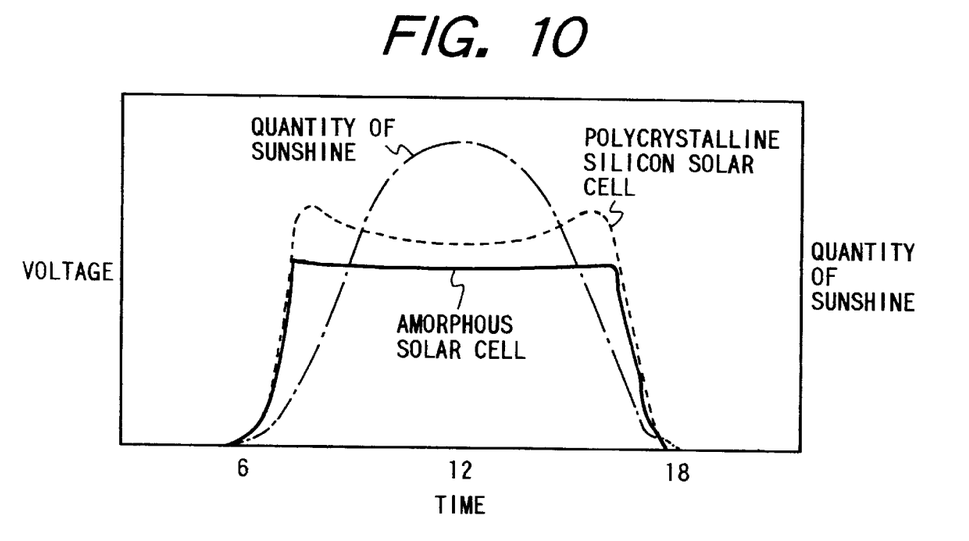
FIG. 10 is a graph for explaining changes in output voltage for a day at an optimum operation voltage.

However, the amorphous solar cell using an amorphous semiconductor is preferably used since it can be manufactured with low cost and has characteristics, as shown in FIG. 10.

FIG. 10 is a graph for comparing changes in optimum operation voltage for a day of an amorphous solar cell and a crystalline solar cell. As shown in FIG. 10, since the optimum operation voltage of the amorphous solar cell does not change largely independently of variations of the quantity of sunshine, the amorphous solar cell does not require any optimum operation voltage tracking control. When the DC source voltage is set to be an optimum operation voltage, the crystalline solar cell has a loss of about 3 to 4% as compared to a case wherein the optimum operation voltage tracking control is performed, while the amorphous solar cell has almost no loss. As can be seen from the above description, it is very effective to use the amorphous solar cell in the present invention.

Figure 11:
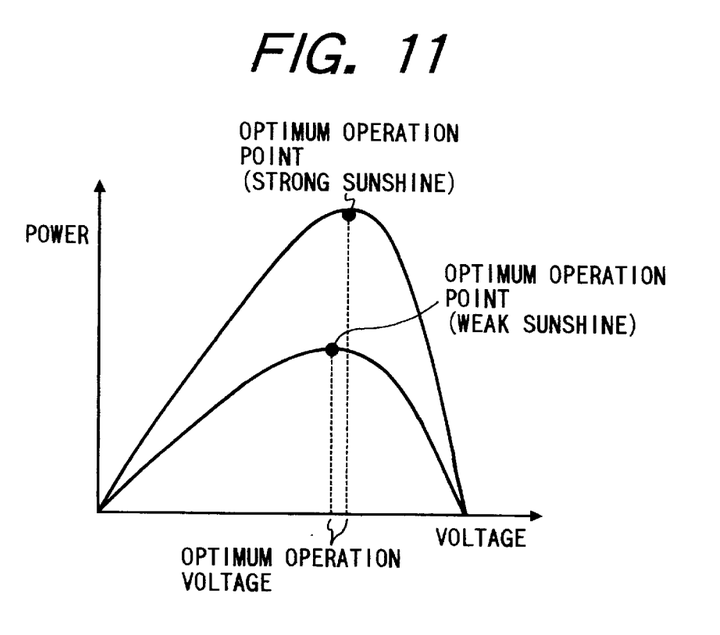
FIG. 11 is a graph showing an example of the voltage-power characteristics of the solar cell.

Furthermore, when the voltage of the DC source obtained by rectifying an output from the commercial source is set to roughly match the optimum operation voltage of the solar cell, as shown in FIG. 11, energy can be efficiently obtained from the solar cell. In particular, in the case of the amorphous solar cell, since a change in optimum operation voltage due to a variation of the quantity of sunshine or a change in temperature is smaller than that of a crystalline solar cell, energy can be efficiently performed without performing any optimum operation voltage tracking control. In addition, the amorphous solar cell can be adhered to a curved surface owing to its structure, and the use of the amorphous solar cell leads to a weight reduction of the overall apparatus.

(Effect)

According to the present invention, power of a solar cell can be effectively supplied to a load, and a power short can also be supplemented by power supplied from a DC source with a simple arrangement. When the DC source is a source obtained by rectifying an output from a commercial AC source, power can be stably supplied to the load irrespective of the remaining capacity.

According to the present invention, when the solar cell is connected to a device serving as a load, the device can be prevented from being damaged or causing an operation error due to a surge voltage caused by the open voltage of the solar cell.

According to the present invention, since the switch is arranged at the side of the solar cell, when the consumption power of the load decreases and the voltage applied to the load increases, the solar cell can be disconnected.

According to the present invention, when the DC source voltage is set to be an optimum operation voltage of the solar cell, power can be efficiently obtained from the solar cell. In particular, in the case of an amorphous solar cell, power can be efficiently obtained without any optimum operation voltage tracking control.

Note that the present invention is not limited to the above description, and various modifications and combinations may be made within the scope of the invention.

What is claimed is:

1. A DC source system having a solar cell and a DC source both connected to a load, in which a first path comprising the solar cell and a second path comprising the DC source are connected in parallel with to the load, comprising:

first switch means arranged, in the first path, between the load and the solar cell;

second switch means arranged, in the second path, between the load and the DC source; and a capacitor of capacitance not less than 10 $\mu$F arranged in parallel with the first path, wherein, when the first switch means connects the solar cell to the load, the first switch means closes before closing of the second switch means for connecting the load to the DC source via the second switch means, thereby electrically connecting the solar cell and the DC source to the load in parallel, via the first path and the second path.

2. A system according to claim 1, further comprising reverse-flow prevention means, arranged between the load and the solar cell, and between the load and the DC source, for preventing reverse flow of a current.

3. A system according to claim 1, wherein highest power generated by the solar cell does not exceed lowest consumption power of the load.

4. A system according to claim 1, wherein the DC source obtains a DC current from a commercial source via a rectification circuit.

5. A system according-to claim 1, wherein a voltage of the DC source substantially matches an optimum operation voltage of the solar cell.

6. A system according to claim 1, wherein the solar cell comprises an amorphous solar cell.

7. A system according to claim 1, further comprising delay means for closing said second switch means after said first means.

8. A system according to claim 1, wherein each of said first and second switch means comprises a switch having a contact.

9. A system according to claim 1, wherein each of said first and second switch means comprises a semiconductor element.

10. A system according to claim 9, wherein the semiconductor element comprises a transistor.

11. A system according to claim 10, wherein said first switch means is closed, and thereafter, the second switch means is closed.

* * * * *